BEST AVAILABLE COPY

Nov. 18, 1924.

Re. 15,951

F. DESSAUER

ELECTRICAL TRANSFORMER SYSTEM

Original Filed July 23, 1918 3 Sheets-Sheet 1

Inventor
Friedrich Dessauer,
By Watson, Cole, Morse & Grindle,
Attorneys.

Nov. 18, 1924.

Re. 15,951

F. DESSAUER

ELECTRICAL TRANSFORMER SYSTEM

Original Filed July 23, 1918 3 Sheets-Sheet 2

Inventor

Friedrich Dessauer,

By Watson, Cole, Moore & Grindle,

Attorneys.

Nov. 18, 1924. Re. 15,951

F. DESSAUER

ELECTRICAL TRANSFORMER SYSTEM

Original Filed July 23, 1918 3 Sheets-Sheet 3

Inventor

Friedrich Dessauer,

By Watson, Cole, Morse & Grindle,

Attorneys.

Reissued Nov. 18, 1924. Re. 15,951

UNITED STATES PATENT OFFICE.

FRIEDRICH DESSAUER, OF FRANKFORT-ON-THE-MAIN, GERMANY.

ELECTRICAL TRANSFORMER SYSTEM.

Original No. 1,372,653, dated March 22, 1921, Serial No. 246,405, filed July 23, 1918. Application for reissue filed March 21, 1923. Serial No. 626,708.

*To all whom it may concern:*

Be it known that I, FRIEDRICH DESSAUER, a citizen of Germany, residing at Frankfort-on-the-Main, in Germany, have invented a new and useful Electrical Transformer System, of which the following is a specification.

This invention relates to high tension transformer systems, one of its principal objects being to provide an improved arrangement of transformers, either for step-up or step-down transformation, which is lighter, cheaper, and more compact and has greater working security than those heretofore known. Another object is to provide an improved arrangement in which the potential stresses throughout the system are distributed and controlled so that the quantity of insulation heretofore required may be greatly reduced. Still another object is to provide a system of transformation which may be extended indefinitely to increase the voltage of the high tension circuit merely by the addition of transformer units without increasing the potential stresses in those units already installed. These and other objects of the invention will be apparent in the annexed description and accompanying drawings, in which—

Figure 1:
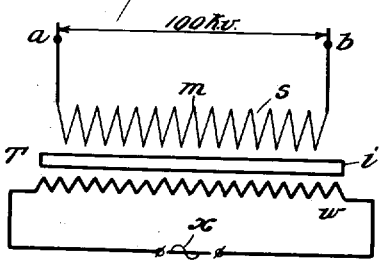
Figure 1A:
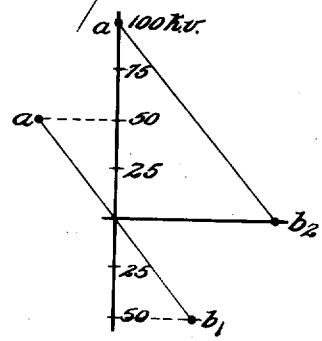
Figure 2:
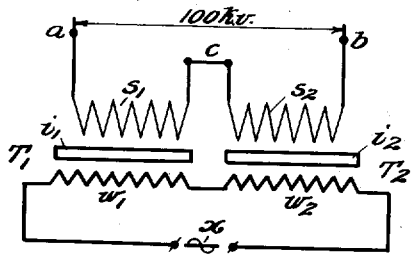
Figure 2A:
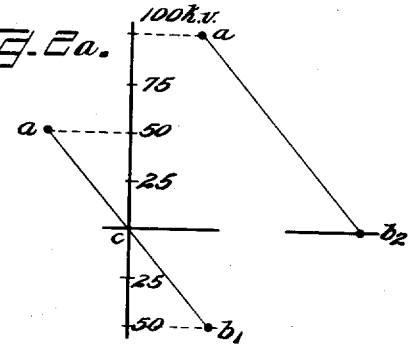
Figure 3:
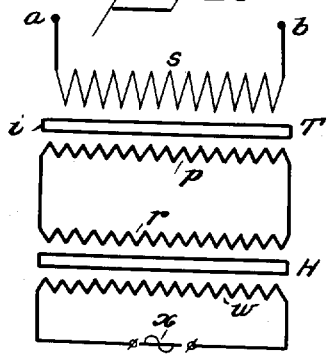

Figs. 1, 2 and 3 illustrate various forms of known transformer systems.

Figs. 1ª and 2ª show the potential stresses between various parts of the systems shown in Figs. 1 and 2 respectively.

Figure 4:
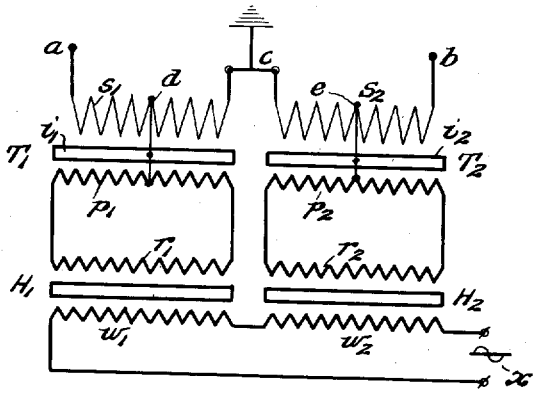
Figure 4A:
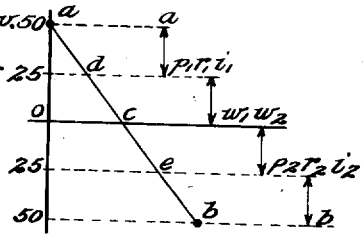

Fig. 4 shows a system arranged according to one form of my invention.

Fig. 4ª represents the potential relations existing in the arrangement of Fig. 4.

Figure 5:
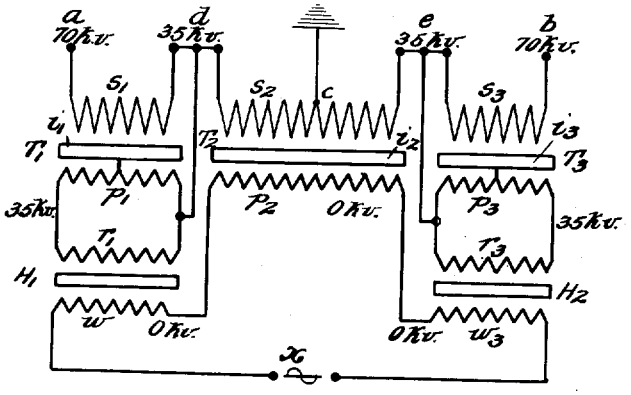
Figure 6:
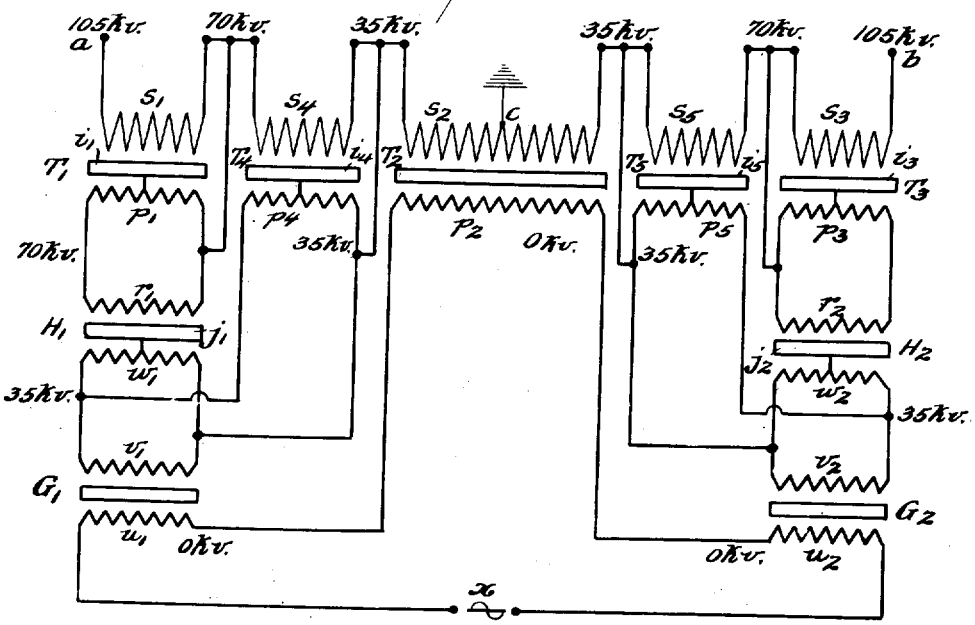

Figs. 5 and 6 show the system of Fig. 4 extended to include additional transformation units.

Fig. 5ª represents the potential relations existing in the arrangement of Fig. 5, and Figs. 7, 8 and 9 illustrate modified forms of the invention.

Throughout the description I shall use the term "high tension winding" and "low tension winding" in the customary sense of windings between whose terminals there exists a relatively high and relatively low potential difference or voltage respectively. I shall use "potential" to mean absolute potential or potential with respect to the earth, except in cases expressly stated otherwise, and when the term "potential" is applied to coils or windings it means the maximum instantaneous potential existing in any turn of the winding.

In high tension transformers of a given size, the electrical stresses to which the insulating layers are subject, and thus the danger that these layers be damaged or punctured, depends upon the potential difference existing between the sides of the layer. In transformers heretofore known it has been impossible to maintain this potential difference less than a certain limit, namely one-half of the voltage or potential difference between the ends of the high tension winding, and even this condition can be maintained only when the middle point of the high tension winding is grounded or maintained at earth potential. Thus in case the system is so arranged that the high tension winding of a given unit cannot be grounded or can only be grounded at one end, this potential difference cannot by any means heretofore known be made smaller than the voltage of the high tension winding.

For example, Figure 1 represents an ordinary high tension transformer having a low tension winding $w$ connected to an alternating current circuit $x$ and having a core $i$ and a high tension winding $s$. Assume that the voltage of the secondary winding is 100 kilovolts. In Figure 1ª the number of secondary turns of the winding $s$ are plotted as abscissæ and the potentials of the corresponding turns plotted as ordinates. If the end $b$ of the secondary winding is grounded the line $ab_2$ represents the potentials of various portions of the winding. In this case there exists a maximum potential difference of one hundred kilovolts between the high tension winding on one hand, and the core and low tension winding on the other hand, which latter are usually at substantially earth potential. If however the middle point $m$ of the winding $s$ is grounded the potentials of the various turns of the winding are shown by the line $ab_1$ and it will be seen that the maximum difference of potential existing between the core or primary winding and the adjacent turns of the secondary winding is 50 kliovolts or one-half the voltage of the secondary winding.

In Figure 2 two transformers $T_1$ and $T_2$ are connected with their high tension windings in series, the arrangement being otherwise similar to that shown in Figure 1. Likewise in this case if the conductor $c$ by which the two secondaries $s_1$ and $s_2$ are connected is grounded the difference of potential between the points $a$ or $b$ on the one hand and the primaries $w_1$ and $w_2$ and the iron cores $i_1$ and $i_2$ on the other hand will be 50 kilovolts, as shown by the line $ab_1$ in Figure 2[a].

It has previously been proposed to distribute the insulation stresses by interposing between the low tension winding and the external alternating current circuit one or more transformers which transmit energy in non-conductive relation. This arrangement is shown in Figure 3, wherein the low tension winding $p$ of the transformer T is connected to the winding $r$ of a transformer H which is preferably of a 1 to 1 ratio. The other winding $w$ of the transformer $h$ is connected to the external circuit $x$. Even in this case the potential difference between the winding $s$ and the core $i$ or low tension winding $p$ cannot be maintained less than one-half of the potential of the secondary winding.

With the means heretofore known, we are, as is pointed out in the foregoing, bound to deal with a minimum difference of potential (amounting to half the potential of the high tension winding) between those parts of the transforming arrangement which are most exposed to the danger of being damaged. In consequence, the insulating parts of the arrangement must be constructed to withstand that difference of potential. This drawback is so much the more serious, as the insulating parts in transformers are strained to the utmost by the high voltages which are in use at present in certain applications of transformers, such as in high voltage testing apparatus or in Roentgen-ray apparatus for the treatment of diseases. Moreover it is to be expected that it will become desirable to use still higher voltages in these applications as well as in high tension work in general. A voltage of more than 100000 volts requires cumbersome and expensive transformers to fulfill the necessary working conditions.

The essential progress brought about by my invention is that the heretofore unvariable relation between the secondary voltage and the strain of the dielectric in transformers may be controlled. The maximum potential difference between the secondary and other parts of a transformer is not limited to at least the half of the secondary voltage; it may be diminished at will. Correspondingly the difference of potential between the secondary and any part of the transformer may be diminished.

I will now describe in detail by way of example a number of embodiments of my invention.

Figure 4 shows two transformers $T_1$ and $T_2$ the high tension windings $s_1$ and $s_2$ of which are connected in series. The low tension windings $p_1$ and $p_2$ of these transformers are connected across the windings $r_1$ and $r_2$ respectively of the transformers $H_1$, $H_2$, the ratio of transformation of which is preferably but not necessarily 1 to 1. The purpose of $H_1$ and $H_2$ is to join the low tension windings $p_1$ and $p_2$ in energy transmitting relation with an external alternating current circuit $x$, which may be either a generating or consuming circuit, and at the same time to insulate the windings $p_1$ and $p_2$ from each other and from this circuit. The point of junction $c$ of the high tension windings $s_1$ and $s_2$ is grounded. Therefore at an assumed high tension voltage of 100 kilovolts between the terminals $a$ and $b$ the potential of either $a$ or $b$ is 50 kilovolts. Therefore the middle points $d$ and $e$ of the transformers $T_1$ and $T_2$ are at a potential of 25 kilovolts. The points $d$ and $e$ are connected respectively to the core $i_1$ and low tension winding $p_1$ and the core $i_2$ and low tension winding $p_2$. Therefore the maximum difference of potential between the secondary windings and any adjacent part of the corresponding transformers is only 25 kilovolts. This relation is shown graphically in Figure 4[a] in which the number of turns of the secondary winding are plotted as abscissæ against the potentials of the terms as ordinates. The potentials of the various elements of the system are indicated by the letters $a$, $p$, $r$, $i$, etc., with appropriate subscripts. Thus the maximum difference of potential between any two adjacent groups of conductors in this system is limited to one quarter of the voltage of the high tension circuit, that is the electrical strain in the system is a quarter of what it would otherwise be. It is true that the transformers $H_1$ and $H_2$ have to sustain a potential difference of 25 kilovolts between their primary and secondary windings but this requirement is easily met as these transformers are usually small and both windings have equal numbers of turns. In this discussion it is assumed that the potential of the windings $w_1$ $w_2$ is that of the earth since the actual potential of these windings will in practice be in the neighborhood of 200 volts, an amount which is negligible in comparison with the voltage of the high tension circuit which may be from 100 to 300 kilovolts.

Since the high tension windings $s_1$ and $s_2$ are connected in series it is obvious that a single winding may be used instead of these two. Therefore the essential feature of this modification of the invention is that at least three windings cooperating to produce a high tension current are used (namely the single winding $s_1$, $s_2$ and the two windings $p_1$, $p_2$) and that at least two of these windings (namely $p_1$ and $p_2$) are placed in a separate branch of energy transmission, each branch of energy transmission being designated by separate transformers $H_1$ and $H_2$. It will be seen that these branches permit the transmission of energy in non-conductive relation and keep the low tension winding $p_1$ $p_2$ insulated from each other and from the external circuit $x$.

Since the stress upon the insulation of the high tension transformers is so materially reduced, a much smaller quantity of insulation is required, and consequently the price of these transformers is reduced more than enough to compensate the additional cost of the transformers $H_1$ and $H_2$. The net cost of the system is thus materially lessened. Moreover due to the reduction of the potential stresses between the adjacent points the working security of the system is greatly increased and I wholly avoid loss of energy by the phenomenon of silent or glow discharge which is well known in high tension work and which frequently attains considerable amounts.

Figure 5A:
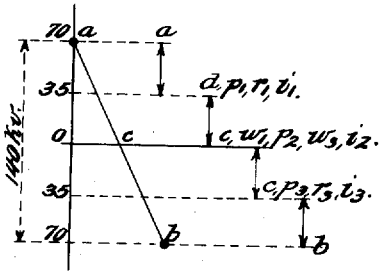

Figure 5 illustrates the modification of Figure 4 extended to include three high tension transformation units $T_1$ $T_2$ $T_3$ which have their high tension windings $s_1$ $s_2$ $s_3$ connected in series. In this case the middle point $c$ of the high tension circuit is grounded, the potentials of the points $a$, $b$, $d$ and $e$ being indicated by way of example in the drawing. The potentials of the various parts of the system are indicated graphically in Figure 5a. Assume a potential difference or voltage of 140 kilovolts between the terminals $a$ and $b$ of the high tension circuit, the potential of the points $a$ and $b$ is then 70 kilovolts and the potential of the point $d$ and $e$ is 35 kilovolts. The low tension windings $p_1$ and $p_3$ are linked to the external circuit $x$ through auxiliary transformers $H_1$ and $H_2$ as in Figure 4, the low tension winding $p_2$ being connected in series with the low tension windings $w_1$ and $w_2$. The low tension windings $p_1$ and $p_3$ are connected to the cores $i_1$ and $i_3$ and to the points $d$ and $e$ respectively, which latter are at a potential of 35 kilovolts. These cores and windings are therefore maintained at 35 kilovolts and the maximum potential difference between them and their adjacent high tension windings is 70 kilovolts minus 35 kilovolts or 35 kilovolts. In this case the auxiliary transformers $H_1$ and $H_2$ are insulated to withstand 35 kilovolts and the potential difference between any two adjacent conductors in the system cannot be more than 35 kilovolts or one fourth of the voltage of the system.

Figure 6 shows the system of Figures 4 and 5 extended to include 5 high tension transformation units producing a voltage of 210 kilovolts. This extension is effected merely by the insertion of an additional high tension unit $T_4$ between units $T_1$ and $T_2$ and an additional unit $T_5$ between $T_2$ and $T_3$ together with the addition of auxiliary transformers $G_1$ and $G_2$ between the auxiliary transformers $H_1$ and $H_2$ and the external circuit $x$. The unit $T_2$ is assumed to have a voltage across its high tension winding $s_2$ of 70 kilovolts as in Figure 5 and each of the other units $T_1$ $T_3$ $T_4$ and $T_5$ is assumed to have a voltage of 35 kilovolts. Thus with the middle point of the system $c$ grounded the total voltage of the high tension circuit is 210 kilovolts and the potentials of the points between the various high tension windings are 35 kilovolts and 70 kilovolts as indicated in Figure 6. The low tension windings $p_1$ and $p_3$ and the cores $i_1$ and $i_3$ are now connected to points whose potential is 70 kilovolts and the transformers $H_1$ and $H_2$ as before are made to withstand 35 kilovolts. The low tension windings $p_4$ and $p_5$ are connected to the cores $i_4$ and $i_5$ and to points in the high tension system whose potential is 35 kilovolts. The windings $p_4$ and $p_5$ are likewise connected across the windings $v_1$ and $v_2$ of the transformers $G_1$ and $G_2$ which are connected in series with the windings $w_1$ and $w_2$ of the transformers $H_1$ and $H_2$. The windings $w_1$ and $w_2$ and $v_1$ and $v_2$ are thus maintained at an absolute potential of 35 kilovolts. The transformers $G_1$ and $G_2$ are likewise made to withstand a potential of 35 kilovolts and can thus be connected between the external circuit $x$ and the auxiliary transformers $H_1$ and $H_2$, the windings $r_1$ and $r_2$ of which are at a potential of 70 kilovolts.

Obviously, any one of the arrangements of Figs. 4, 5 and 6 can easily be formed out of its precedents (e. g. Fig. 6 out of Fig. 5, 4 or 1), merely by adding transformers. This is an important advantage of my system—viz, I am enabled, by my system, to adapt, by the mere addition of transformers, a given alternating current supply apparatus to a higher range of voltage, and nevertheless to make use of all the parts of the given apparatus as before. Preferably, I avail myself of standardized types of additional transformers (especially in the form of 1:1 transformers), their manufacture and repair being simple.

Figure 7:
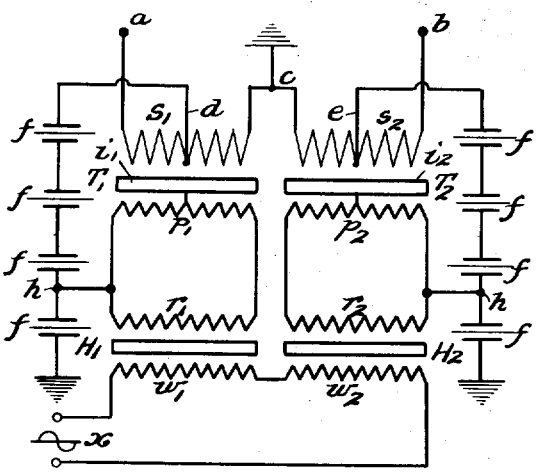

As is demonstrated by Fig. 7, I may modify my system, so as to allow the potential of any of the several groups of conductors to be regulated at will. In Fig. 7, the middle $d$ ($e$) of the high tension windings $s_1$ ($s_2$) of each of the two high tension transformers $T_1$ and $T_2$ is connected to the ground by a series of condensers $f$, and another connection is made between the circuit of the respective primary winding $p_1$ ($p_2$) and a point $h$ in the set of condensers. According as I choose that point of connection $h$, I obtain, within the limits of the potential of the middle of the high tension winding on one hand, and the ground on the other hand, any desired potential of the low tension winding $p_1$ ($p_2$) and iron core $i_1$ ($i_2$). Instead of a series of condensers, as in Fig. 7, I may make use of an adjustable resistance to effect the desired potential. In some cases I find it advisable to regulate the potential of the various groups of conductors by connections to independent sources of energy, instead of deriving their electrical charge from the corresponding high tension transformer in the system.

Figure 8:
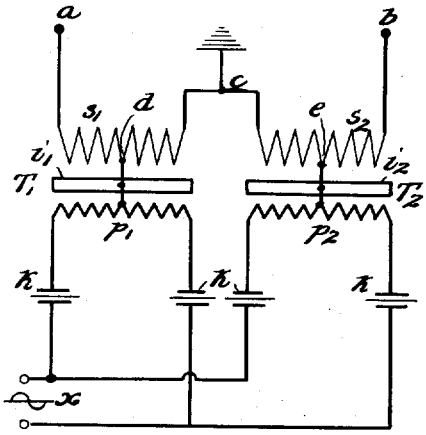
Figure 9:
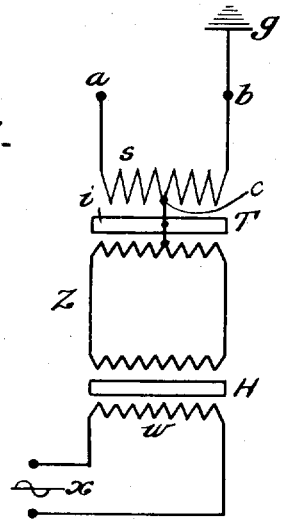

As already mentioned, not only transformers but any device capable of transmitting electrical energy without a conductive relation between its energy transmitting parts, as, for instance, condensers, may be used to produce the separation of the groups of conductors and therefore to enable their levels of potential to be adjusted. This form of my system is exemplified by Fig. 8. Fig. 8 is in accordance with Fig. 4 except that the place of the transformers $H_1$ and $H_2$ of Fig. 4 is taken by condensers $k$.

The artificial adjustment of the potential of the groups of conductors, according to my invention may be advantageously applied even to cases in which the maximum difference of potential between the high tension winding and the other parts of the same transformer need not be reduced to less than one half of the secondary voltage. In the case, for example, of a high tension transformer having one end of its high tension winding grounded for any reason, the maximum difference of potential acting upon the insulating layers of arrangements heretofore known, amounts, as is stated above, to the total secondary voltage of the transformer, and cannot be reduced by any means heretofore devised. By inserting an intermediate circuit, the level of potential of which is made adjustable, according to my invention, I reduce the strain of the insulating layers to one half of what it unavoidably amounted to in the heretofore known transformers with one end of the high tension winding grounded. This is demonstrated by Fig. 9 which shows an arrangement similar to that of Fig. 3. As already stated in connection with Fig. 3, it is impossible to reduce the strain of the insulating layers by a mere repeated transformation. If, however, the intermediate circuit Z and iron core $i$ is, as in Fig. 9, connected to the middle $c$ of the high tension winding $s$, or otherwise kept on a level of potential situated between the potentials of the ends $a$ and $b$ of $s$ on one hand and of the supply circuit $wx$ on the other hand, then the strain can be reduced to a half, even if one end ($b$) of the high tension winding $s$ is in connection with the ground $g$.

In many cases, I have found, that the connection between the iron cores and windings, as shown in Figs. 4–9, may as well be omitted, as the iron cores, being embedded between the coils, usually adopt automatically an average level of potential as compared with the surrounding coils.

It is to be understood that the invention is not limited to the particular details described for the sake of illustration but includes modifications which fall within the scope of the appended claims. For instance, the system is equally well adapted to step-up and step-down transformation. Furthermore I have described the high tension windings as connected directly in series, but the term "connected so that their voltages are accumulative" is intended to include any connection of the high tension windings so that the voltages of the individual windings add, whether the windings are connected directly to each other or linked in series by means of intermediate windings or other apparatus.

Having thus described the invention what is claimed as new and desired to be secured by Letters Patent is:

1. In a high tension transformer system, in combination, a plurality of transformers having high tension and low tension windings, the transformers being so connected that the voltages of the high tension windings are cumulative, and means for maintaining the low tension windings at desired potentials with respect to the high tension windings.

2. In a high tension transformer system, in combination, a plurality of transformers each having a high tension winding, a low tension winding, and a core, the transformer being so connected that the voltages of the high tension windings are cumulative, and means for maintaining the low tension windings and the cores at desired potentials with respect to the high tension windings.

3. In a high tension transformer system, in combination, a plurality of high tension transformers each having a high tension winding and a low tension winding, the transformers being so connected that the voltage of the high tension windings are cumulative, and means for maintaining the maximum potential difference between the high tension windings and all other conductive parts of the respective transformers less than the maximum potential difference between the high tension windings and the earth.

4. In a high tension transformer system, in combination, a plurality of transformers each having a high tension winding, a low tension winding, and a core, the transformers being connected so that the voltage of the high tension windings are cumulative, and connections between the respective cores and high tension windings at points in the high tension circuit whose potentials to earth are less than the maximum potentials of the respective high tension windings.

5. In a high tension transformer system, in combination, a plurality of transformers each having a high tension winding and a low tension winding, the transformers being so connected that the voltage of the high tension windings are cumulative, and connections between the respective low tension and high tension windings at points in the high tension circuit whose potentials to earth are less than the maximum potentials of the respective high tension windings.

6. In a high tension transformer system, in combination, a plurality of transformers having high and low tension windings, the high tension windings being connected in series, an external alternating current circuit, means for linking the low tension windings to said circuit in energy-transmitting relation, and means for maintaining the low tension windings at desired potentials with respect to the high tension windings.

7. In a high tension transformer system, in combination, a plurality of transformers each having a high tension winding and a low tension winding, the high tension windings being connected in series, an external alternating current circuit, means for linking the low tension windings with said circuit in energy transmitting relation and for insulating the circuit therefrom and means for maintaining the low tension windings at a potential different from that of the circuit.

8. In a high tension transformer system, in combination, a plurality of transformers having high tension and low tension windings, the high tension windings being connected in series, an external alternating current circuit, means comprising auxiliary transformers for linking the low tension windings with the circuit and insulating the circuit therefrom and means for maintaining the low tension windings at a potential different from that of the circuit.

9. In a high tension transformer system, in combination, a plurality of transformers having high and low tension windings, the high tension windings being connected in series, an external alternating current circuit, means for linking the low tension windings with said circuit in energy transmitting relation, and connections between the low tension windings and their corresponding high tension windings at points in the high tension circuit whose potentials to earth are less than the maximum potentials of the respective high tension windings.

10. In a high tension transformer system, in combination, a transformer having a high tension and a low tension winding, means connecting said windings at a point whose potential to earth is equal to or greater than the maximum potential difference in said windings, an external alternating current circuit, and means for linking the low tension winding to the circuit in energy transmitting relation and for insulating the low tension winding therefrom.

11. In a high tension transformer system, in combination, a transformer having a high tension and a low tension winding, means for linking the low tension winding with an external alternating current circuit, said means having energy-transmitting parts in non-conductive relation, and means for maintaining a smaller potential difference between the low tension and high tension winding than that existing between the high tension winding and the ground.

12. In a high tension transformer system, in combination, one or more transformers each having a high tension and a low tension winding, means for linking the low tension windings with an external alternating current circuit, and connecting means between the respective low tension and high tension windings at points in the high tension circuit whose potentials to earth are equal to or greater than the maximum potential difference between the respective high tension and low tension windings.

13. In a high tension transformer system, in combination, one or more transformers each having a high tension and a low tension winding, one or more auxiliary transformers having an approximate one to one ratio of transformation for linking the low tension winding with an external alternating current circuit, and connecting means between the respective high tension and low tension windings at points in the high tension circuit whose potentials to earth are equal to or greater than the maximum potential difference between the respective high tension and low tension windings.

14. In a high tension transformer system, in combination, three or more windings cooperating to produce a high tension current, two or more branches of energy transmission, each branch including one of said windings and one or more auxiliary transformers, each of said windings which is included in the branches of energy transmission being connected to a point in the high tension circuit between which and the ground there exists a potential difference equal to or greater than the maximum potential difference existing between adjacent windings.

15. In a high tension transformer system, in combination, three or more windings cooperating to produce a high tension current, two or more branches of energy transmission, each branch including one of said windings and one or more auxiliary transformers, each of said windings which is included in the branches of energy transmission being connected to a point in the high tension circuit between which and the ground there exists a potential difference equal to or greater than the maximum potential difference existing between adjacent windings, said auxiliary transformers having an approximate one to one ratio of transmission.

16. In a high tension transformer system, in combination, a transformer having high and low tension windings, devices for linking the low tension winding with the alternating current circuit, said devices having energy transmitting parts in non-conductive relation, and means for maintaining a smaller difference of potential between the conductive parts of the transformer adjacent to each other than that existing between the high tension winding and the ground.

In testimony whereof I hereunto affix my signature.

DR. FRIEDRICH DESSAUER.

Witnesses:
GERHARD HÜBERS,
JOSEF KNECHT.